US009547219B2

(12) United States Patent
Jang et al.

(10) Patent No.: US 9,547,219 B2
(45) Date of Patent: Jan. 17, 2017

(54) PHOTOGRAPHING APPARATUS HAVING AN EXTERNAL OPTICAL COMPONENT CONNECTOR AND METHOD OF CONTROLLING THE SAME

(71) Applicant: SAMSUNG ELECTRONICS CO., LTD., Suwon-si, Gyeonggi-do (KR)

(72) Inventors: Nam-young Jang, Suwon-si (KR); Byung-deok Nam, Seoul (KR); Yong-wook Kim, Suwon-si (KR); Jang-hoon Yoo, Seoul (KR); Seon-jeong Lee, Hwaseong-si (KR); Tae-youn Lee, Yongin-si (KR); Eun-ho Choi, Yongin-si (KR); Sung-bin Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 14/044,277

(22) Filed: Oct. 2, 2013

(65) Prior Publication Data
US 2014/0184838 A1  Jul. 3, 2014

(30) Foreign Application Priority Data

Dec. 28, 2012 (KR) .......................... 10-2012-0157202

(51) Int. Cl.
*G03B 17/14* (2006.01)
*H04N 5/225* (2006.01)
*H04N 5/232* (2006.01)

(52) U.S. Cl.
CPC .............. *G03B 17/14* (2013.01); *H04N 5/225* (2013.01); *H04N 5/2328* (2013.01)

(58) Field of Classification Search
CPC ............................. H04N 5/2251; H04N 9/045
(Continued)

(56) References Cited

U.S. PATENT DOCUMENTS 7,830,628 B2 * 11/2010 Schaefer .................. G02B 7/02
  359/819
2003/0048374 A1 * 3/2003 Minakuti et al. ............ 348/360
(Continued)

FOREIGN PATENT DOCUMENTS

JP         2004233722 A  *  8/2004    ............ G03B 17/56

OTHER PUBLICATIONS

Nakada Shigemi; JP Patent Application Pub 2004-233722A; English Translation; Aug. 2004.*

*Primary Examiner* — Roberto Velez
*Assistant Examiner* — Cynthia Segura
(74) *Attorney, Agent, or Firm* — Drinker Biddle & Reath LLP (57) ABSTRACT

Provided is a photographing apparatus. The photographing apparatus includes: a main body having an image pickup device disposed therein; a middle cover disposed in a back side of the main body and includes a first opening disposed to correspond to a position of the image pickup device; a first connector formed on the middle cover and around the first opening, where the first connector is configured to couple to an external optical component and is disposed so that the an optical axis of the image pickup device coincides with an optical axis of the external optical component, when the external optical component is coupled to the first connector; and a rear cover disposed on the middle cover and includes a second opening disposed to correspond to the position of the image pickup device.

18 Claims, 7 Drawing Sheets

(58) Field of Classification Search
USPC .......................................................... 348/376
See application file for complete search history.

(56) References Cited

U.S. PATENT DOCUMENTS

| | | | |
|---|---|---|---|
| 2005/0243191 A1* | 11/2005 | Itoh et al. ................. | 348/231.99 |
| 2006/0050170 A1* | 3/2006 | Tanaka .......................... | 348/360 |
| 2006/0056049 A1* | 3/2006 | Tokiwa et al. ................. | 359/684 |
| 2006/0066747 A1* | 3/2006 | Tsuda ............................. | 348/360 |
| 2006/0147200 A1* | 7/2006 | Arimoto et al. ............. | 396/529 |
| 2006/0164516 A1* | 7/2006 | Kurosawa ................ | 348/208.99 |
| 2008/0019000 A1* | 1/2008 | Lee ............................... | 359/511 |
| 2009/0143099 A1* | 6/2009 | Kang ........................ | 455/556.1 |
| 2010/0053344 A1* | 3/2010 | Tsukamoto ................ | 348/208.4 |
| 2011/0229114 A1* | 9/2011 | Okada .............................. | 396/71 |
| 2011/0317062 A1* | 12/2011 | Fujino et al. ................. | 348/360 |
| 2012/0147193 A1 | 6/2012 | Tsai | |
| 2012/0274835 A1* | 11/2012 | Ogino et al. .................. | 348/345 |
| 2012/0275025 A1* | 11/2012 | Parrill .................... | G02B 23/16 359/511 |
| 2013/0076975 A1* | 3/2013 | Kumoi ................. | H04N 5/2254 348/373 |
| 2013/0107114 A1* | 5/2013 | Tobinaga ............. | H04N 5/2253 348/374 |
| 2013/0107115 A1* | 5/2013 | Tobinaga ............. | H04N 5/2253 348/374 |
| 2013/0162608 A1* | 6/2013 | Kwon .................... | G09G 5/003 345/204 |
| 2013/0174042 A1* | 7/2013 | Kim ........................ | G06F 3/048 715/735 |
| 2015/0355527 A1* | 12/2015 | Takahashi .............. | G03B 15/05 348/371 |

* cited by examiner

LEGEND

120a: MIDDLE COVER
160a: FIRST CONNECTOR
170: FIRST OPENING
210: BATTERY COUPLER
220: MEMORY CARD COUPLER
230: USER IDENTIFICATION CARD COUPLER

PHOTOGRAPHING APPARATUS HAVING AN EXTERNAL OPTICAL COMPONENT CONNECTOR AND METHOD OF CONTROLLING THE SAME

CROSS-REFERENCE TO RELATED PATENT APPLICATION

This application claims the priority benefit of Korean Patent Application No. 10-2012-0157202, filed on Dec. 28, 2012, in the Korean Intellectual Property Office, the disclosure of which is incorporated herein in its entirety by reference.

BACKGROUND

1. Field

Various embodiments of the invention relate to a photographing apparatus, and a method of controlling the photographing apparatus.

2. Related Art

Camera functions have recently been frequently applied to portable devices such as smartphones and, tablets, etc. Because portable devices need to be miniaturized and light, cameras provided in portable devices also need to be miniaturized and light. In addition, because of the constraints of the areas to be occupied by the cameras, the number and size of components that may be used in the camera modules also have space constraints. However, because users increasingly require high specification cameras even in portable devices, and because a wide variety of applications and functions using the camera functions are provided for the portable devices, high-performance cameras are also required in the portable devices.

SUMMARY

Various embodiments provide photographing apparatuses to be used in portable devices, in which a variety of optical components may be employed in the photographing apparatuses.

Various embodiments also provide photographing apparatuses, in which the same external optical components may be used in a wide variety of portable devices.

According to an embodiment, a photographing apparatus includes: a main body having an image pickup device disposed therein; a middle cover disposed on a back side of the main body, and includes a first opening disposed to correspond to a position of the image pickup device; a first connector formed on the middle cover around the first opening, where the first connector is configured to couple to an external optical component and is disposed so that an optical axis of the image pickup device coincides with an optical axis of the external optical component, when the external optical component is coupled to the first connector; and a rear cover disposed on the middle cover and has a second opening disposed to correspond to the position of the image pickup device.

The second opening may be formed to match a shape of the external optical component, when the external optical component is coupled to the first connector According to one embodiment, the first connector may include a first electrode that is electrically connected to the external optical component.

According to another embodiment, the first connector may have a shape that surrounds the first opening, and the middle cover may include a first electrode that is formed between the first opening and the first connector and is electrically connected to the external optical component.

According to one embodiment, the main body may further include a lens disposed on the image pickup device.

According to one embodiment, the main body may further include an optical component identifying unit that identifies the type of the external optical component; and an optical component controller that generates a control signal to control the optical component depending on a type of the external optical component.

According to one embodiment, the main body may further include a photographing apparatus controller that deactivates a function of the photographing apparatus, when the function of the photographing apparatus is redundant of a function of the external optical component, depending on a type of the external optical component.

According to one embodiment, the first connector may have a circular-ring shape formed around the first opening and may couple to a second connector of the external optical component.

The external optical component may be at least one of an interchangeable lens, an optical filter, a shutter, an aperture, a microphone, and a flash.

The photographing apparatus may further include a detachable protective cover that covers the image pickup device and couples to the first connector, when the external optical component is not coupled to the first connector.

According to another embodiment, a photographing apparatus includes: a main body having an image pickup device disposed therein; a middle cover disposed on a back side of the main body and includes a first opening disposed to correspond to a position of the image pickup device; a rear cover disposed on the middle cover and includes a second opening disposed to correspond to the position of the image pickup device; and a first connector formed on the rear cover and around the second opening, where the first connector is configured to couple to an external optical component and is disposed so that an optical axis of the image pickup device coincides with an optical axis of the external optical component, when the external optical component is coupled to the first connector.

According to one embodiment, the first connector may have a circular-ring shape formed around the second opening and may couple to a second connector of the external optical component.

The external optical component may be at least one of an interchangeable lens, an optical filter, a shutter, an aperture, a microphone, and a flash.

According to one embodiment, the photographing apparatus may further include a detachable protective cover that covers the image pickup device and couples to the first connector, when that the external optical component is not coupled to the first connector.

According to another embodiment, a method is provided for controlling a photographing apparatus that includes a middle cover disposed on a back side of a main body, and a first connector disposed on the middle cover so that an external optical component is coupled to the first connector, the method includes: identifying a type of the external optical component; depending on the type of the external optical component, generating a control signal to control the external optical component; and depending on the type of the external optical component, deactivating a function of the photographing apparatus that is redundant of a function of the external optical component.

When the external optical component has an anti-shake function, the method may include reducing or omitting a shake correction processing of the photographing apparatus to complement the anti-shake function of the external optical component.

According to an embodiment, the photographing apparatus control method may further include applying an optical zoom function of the external optical instead of an optical zoom function of the photographing apparatus, when the external optical component has the optical zoom function.

The photographing apparatus control method may further include storing information about the external optical component together with a captured image.

In addition, the photographing apparatus control method may further include fixing and deactivating a shutter of the main body in an open state, when the external optical component has a shutter.

Furthermore, the photographing apparatus control method may further include sending an auto-focus control signal to the external optical component, when the external optical component is an interchangeable lens.

According to an embodiment, the photographing apparatus may be used in portable devices and may use various types of optical components.

In addition, according to an embodiment, an external optical component may be used in a wide variety of portable devices.

BRIEF DESCRIPTION OF THE DRAWINGS

The above and other features and advantages will become more apparent by describing in detail exemplary embodiments thereof with reference to the attached drawings in which.

DETAILED DESCRIPTION

As used herein, the term "and/or" includes any and all combinations of one or more of the associated listed items.

The following description and the accompanying drawings are to understand various embodiments of the invention, and the part that is able to be implemented easily by an ordinary technician of in the field of this technology may be omitted. Also the present specification and the accompanying drawings are not provided with the purpose to limit the invention, and the scope of the invention should be determined by the claims. The terms that are used in the present specification should be interpreted as the meanings and concepts corresponding to technical aspects of the invention so as to most adequately express the embodiments of the invention.

With reference to the accompanying drawings, various embodiments will be described.

Photographing apparatuses according to the embodiments may be implemented in the form of mobile phones, smartphones, tablets, notebooks, etc.

Figure 1:
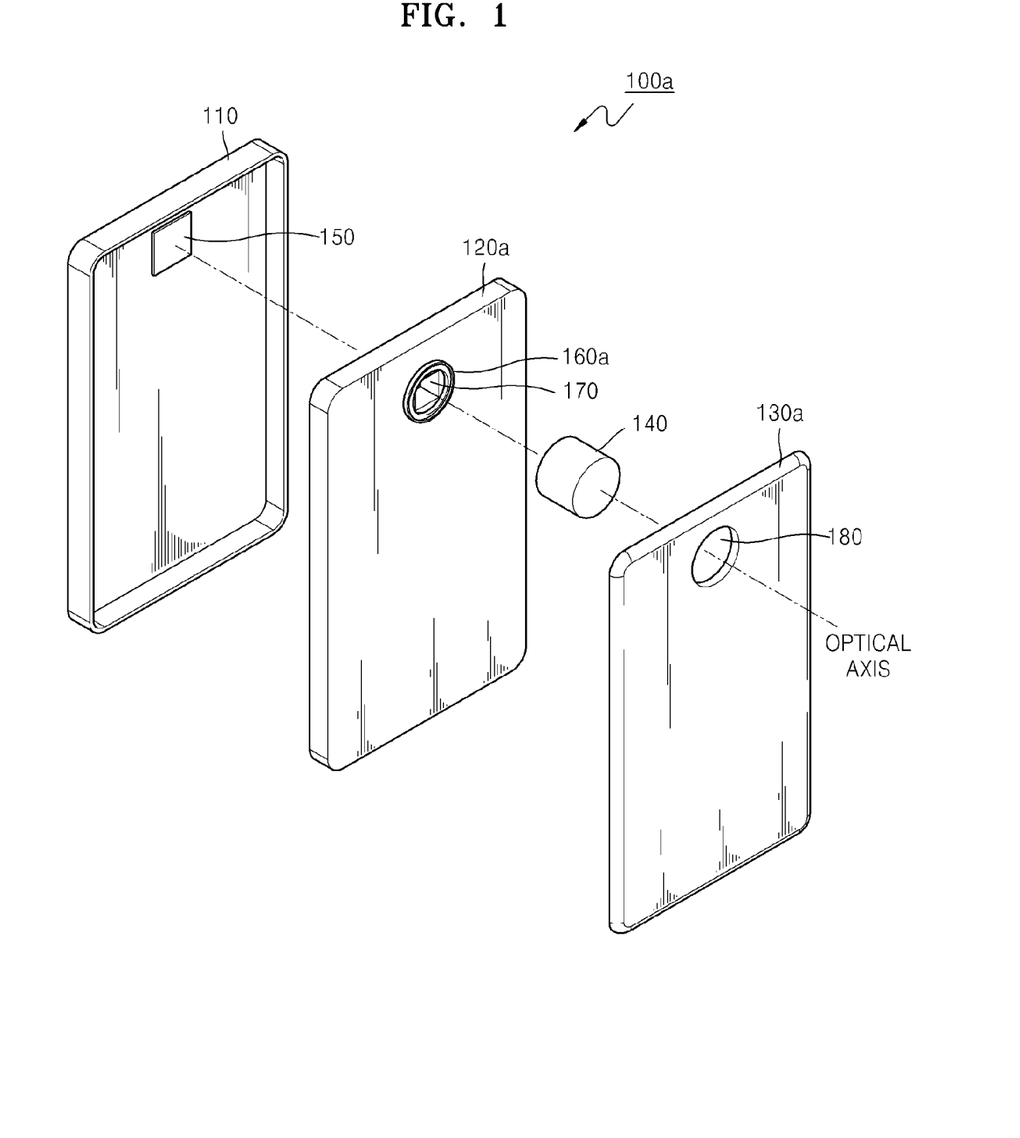
FIG. 1 is a perspective view illustrating a photographing apparatus, according to an embodiment.

FIG. 1 is a perspective view illustrating a photographing apparatus 100a, according to an embodiment.

The photographing apparatus 100a according to an embodiment includes a main body 110, a middle cover 120a, and a rear cover 130a.

The main body 110 includes electronic components to perform main functions of the photographing apparatus 100a. For example, the main body 110 may include a data processing module, a communication module, a memory device, a display, a display driving unit, buttons, a keypad, etc. Also, the main body 110 may include an image pickup device 150. The image pickup device 150 photoelectrically converts incident light to thus generate an image pickup signal. The image pickup signal may be processed in the data processing module, etc., to then be converted to a captured image.

The main body 110 may have the display on its front side, and electronic components on the back side thereof.

The middle cover 120a is coupled to the back side of the main body 110. The middle cover 120a protects the electronic components, by covering the back side of the main body 100 on which electronic components 110 are disposed. The middle cover 120a includes a first connector 160a that is formed to be coupled to an external optical component 140. The first connector 160a may have a coupling structure and a fixing structure, so as to be able to be coupled to the external optical component 140. The first connector 160a is disposed so that the center of the optical axis of the image pickup device 150 coincides with the center of the optical axis of the external optical component 140 when the external optical component 140 is coupled to the first connector 160a. To this end, the center of the first connector 160a may be placed to correspond to the center of the optical axis of the image pickup device 150.

Also, the middle cover 120a has a first opening 170 at a position corresponding to the image pickup device 150. The first opening 170 is positioned in an open form, so that light can be incident onto the image pickup device 150 through the first opening 170. The first connector 160a is disposed on the outer circumference of the first opening 170.

The external optical component 140 is coupled to the first connector 160a of the middle cover 120a, and thus is fixed on the photographing apparatus 100a.

The rear cover 130a is placed and coupled to the middle cover 120a and protects the middle cover 120a. The rear cover 130a has a second opening 180 through which the external optical component 140 may pass through. The rear cover 130a may be detachably coupled to the middle cover 120a.

According to one embodiment, the second opening 180 may have a shape corresponding to the external optical component 140, when the external optical component 140 is coupled to the first connector 160a. Accordingly, if the external optical component 140 is coupled to the first connector 160a of the middle cover 120a, and the rear cover 130a is coupled to the middle cover 120a, the external optical component 140 is supported by the rear cover 130a, thus improving the stability of coupling the external optical component 140.

The external optical component 140 may have a shape capable of passing through the second opening 180 of the rear cover 130a, or may also have a shape not capable of passing through the second opening 180 of the rear cover 130a. If the external optical component 140 is embodied into a shape capable of passing through the second opening 180 of the rear cover 130a, a user may couple the external optical component 140 to the middle cover 120a, and then may couple the rear cover 130a to the middle cover 120a. If the external optical component 140 is embodied into a shape not capable of passing through the second opening 180 of the rear cover 130a, the external optical component 140 may be coupled to the photographing apparatus 110a in the following sequence such that the external optical component 140 is matched with the rear cover 130a: the external optical component 140 is coupled to the first connector 160a of the middle cover 120a, and then the rear cover 130a is coupled to the middle cover 120a.

Since the first connector 160a according to an embodiment is disposed so that the center of the optical axis of the image pickup device 150 coincides with the center of the optical axis of the external optical component 140, the center of the optical axis of the external optical component 140 may be secured to coincide with the center of the optical axis of the image pickup device 150.

In addition, according to one embodiment, the structure of the first connector 160a may be standardized in different types of photographing apparatuses. By this configuration, although a user replaces the photographing apparatus 100a, the external optical component 140 is available to be used in the replaced photographing apparatus 100a, thus improving the compatibility of the external optical component 140.

Figure 2:
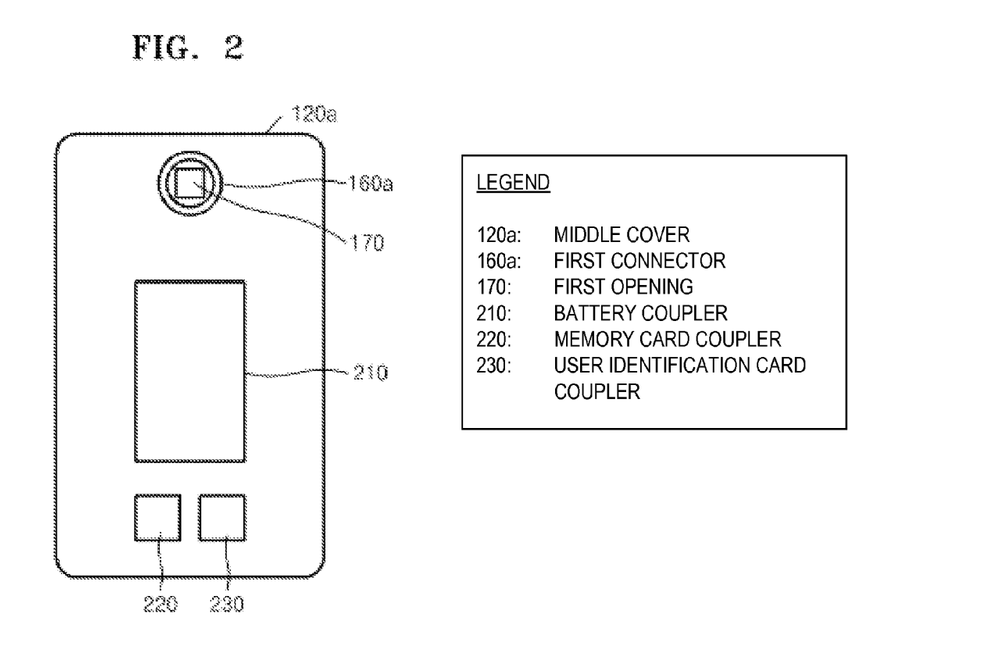
FIG. 2 is a plan view showing a structure of a middle cover, according to an embodiment.

FIG. 2 is a plan view showing the structure of the middle cover 120a, according to an embodiment.

The middle cover 120a according to an embodiment includes the first connector 160a, the first opening 170, a battery coupler 210, a memory card coupler 220, and a user identification card coupler 230. If the photographing apparatus 100a is implemented in the form of a smartphone, a tablet, etc., having a communication function, a battery, a memory card, a user identification card (for example, a user subscriber identification module (USIM) card), etc. may be placed so as to be detachable by users. To this end, according to an embodiment, the middle cover 120a may be provided with the battery coupler 210, the memory card coupler 220, and the user identification card coupler 230. Users may easily attach the battery, the memory card, the user identification card to the middle cover 120a and easily detach the battery, the memory card, the user identification card from the middle cover 120a. Also, since the middle cover 120a is covered with the rear cover 130a, the battery, the memory card, the user identification card, etc. may be protected from external shock. The battery coupler 210, the memory card coupler 220, and the user identification card coupler 230 may be implemented in various forms such as an embedded structure and a slit structure.

Figure 3:
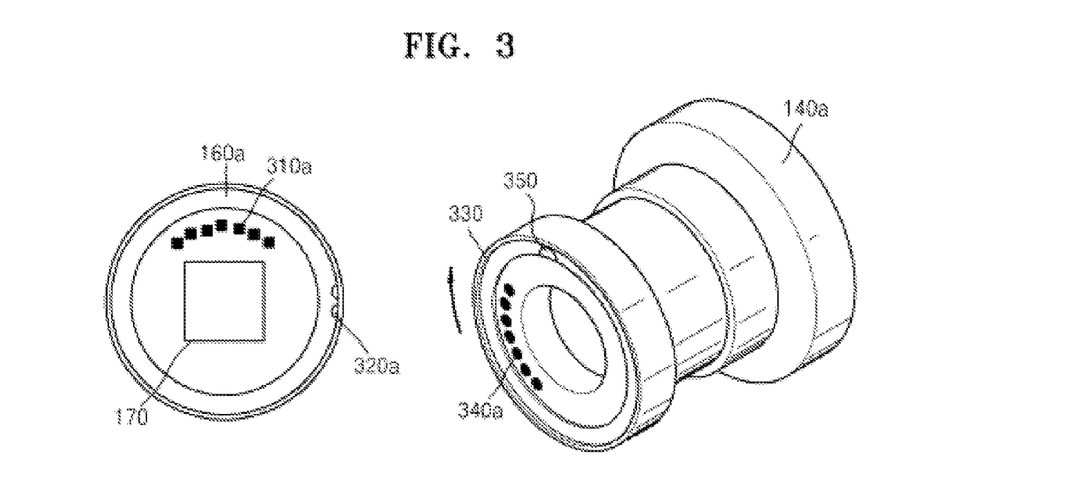
FIG. 3 is a partially enlarged view showing a first connector of the middle cover and a structure of an external optical component, according to an embodiment.

FIG. 3 is a partially enlarged view showing a first connector 160a of the main body 120a and a structure of an external optical component 140a, according to an embodiment.

According to an embodiment, the first connector 160a may be implemented in the form of a closed curve enclosing the first opening 170. A first electrode 310a may be formed in the space between the outside of the first opening 170 and the first connector 160a. The first electrode 310a is electrically connected to a second electrode 340a of the external optical component 140a, when the middle cover 120a is coupled to the external optical component 140a, thereby allowing electrical signals and currents to be exchanged between the main body 110 and the external optical component 140a.

In addition, according to an exemplary embodiment, the first connector 160a may be formed in a circular shape having a rail structure that can be interlocked with a second connector 330 of the external optical component 140a, and may have an anchor 320a to fix the external optical component 140a at a specific position. The anchor 320a is coupled to an anchor 350 of the external optical component 140a, and thus the external optical component 140a does not rotate further, and may be fixed in a particular orientation.

The first connector 160a may be implemented in various forms such as a screw structure and an embedded structure, as alternatives to the form shown in FIG. 3.

The external optical component 140a may be implemented as various types of optical components such as an interchangeable lens, optical filters, external shutters, external apertures, microphones, and a strobe/flash. In the case that the main body 110 has a lens together with the image pickup device 150, the external optical component 140a may be provided in the form of an additional lens. In the case that the main body 110 has no lenses, the external optical component 140a may be implemented in the form of an interchangeable lens.

The external optical component 140a may receive control signals or current from the main body 110 through the second electrode 340a that is disposed in the external optical component 140a. The external component 140a may then be driven by the received control signals or current. For example, the main body 110 provides a lens drive signal and a shutter release signal to the external optical component 140a, to thus control the external optical component 140a. The main body 100 may also supply electric current to the external optical component 140a. Also, the external optical component 140a may provide a signal that represents the type, status, etc., of the external optical component 140a to the main body 110.

Figure 4:
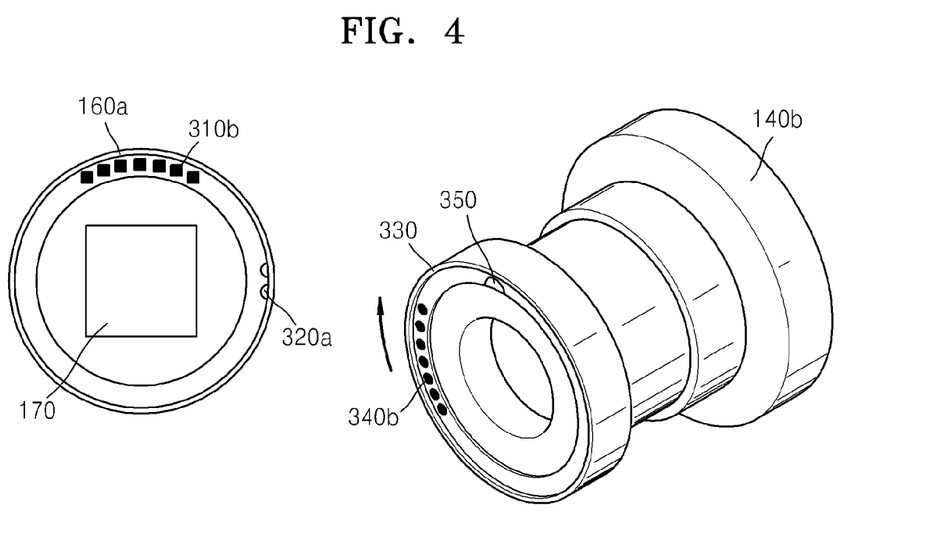
FIG. 4 is a partially enlarged view showing a first connector of the middle cover and a structure of an external optical component, according to another embodiment.

FIG. 4 shows a partially enlarged view of the first connector 160a of the middle cover 120a and a structure of the external optical component 140b, according to another embodiment.

According to another embodiment, the first electrode 310b of the middle cover 120a is disposed on the first connector 160a. Also, the second electrode 340b of the external optical component 140b is disposed on the second connector 330 of the external optical component 140b. According to this embodiment, the distance or space between the first opening 170 and the first connector 160a may be reduced, thereby reducing an area occupied by the first connector 160a in the middle cover 120.

Figure 5:
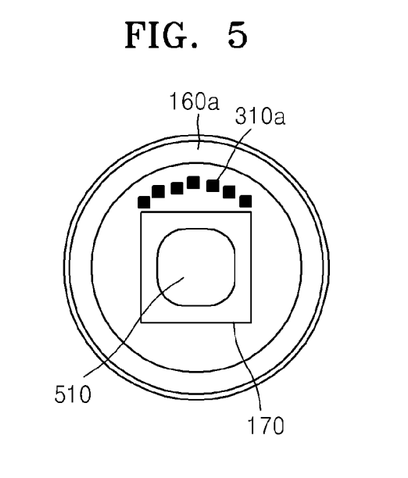
FIG. 5 is a partially enlarged view showing a first connector of the middle cover and a photographing module of the main body, according to an embodiment.

FIG. 5 is a partially enlarged view showing the first connector 160a of the middle cover 120a and a photographing module 510 of the main body 110, according to an embodiment.

According to an embodiment, the main body 110 has the image pickup device 150 (shown in FIG. 1) and a photographing module 510 having optical devices such as a lens and an aperture. According to an embodiment, users may add a lens or use an optical filter, etc., by using the external optical component 140.

Figure 6:
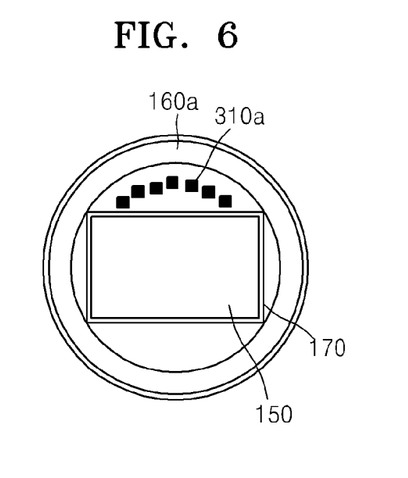
FIG. 6 is a partially enlarged view showing a first connector of the middle cover and the image pickup device of the main body, according to another embodiment.

FIG. 6 is a partially enlarged view showing the first connector 160*a* of the middle cover 120*a* and the image pickup device 150 of the main body 110, according to another embodiment.

According to another embodiment, the main body 110 is provided with the image pickup device 150 but does not have any optical device such as a lens. In the present embodiment, the external optical component 140 is provided as an interchangeable lens. Users may combine a desired lens, such as the external optical component 140, with the photographing apparatus 100*a*.

In the present embodiment, if the external optical component 140 is not coupled to the image pickup device 150, an external cover may be provided to protect the image pickup device 150. The external cover is coupled to the first connector 160*a*, to thus protect the image pickup device 150 from the outside.

Figure 7:
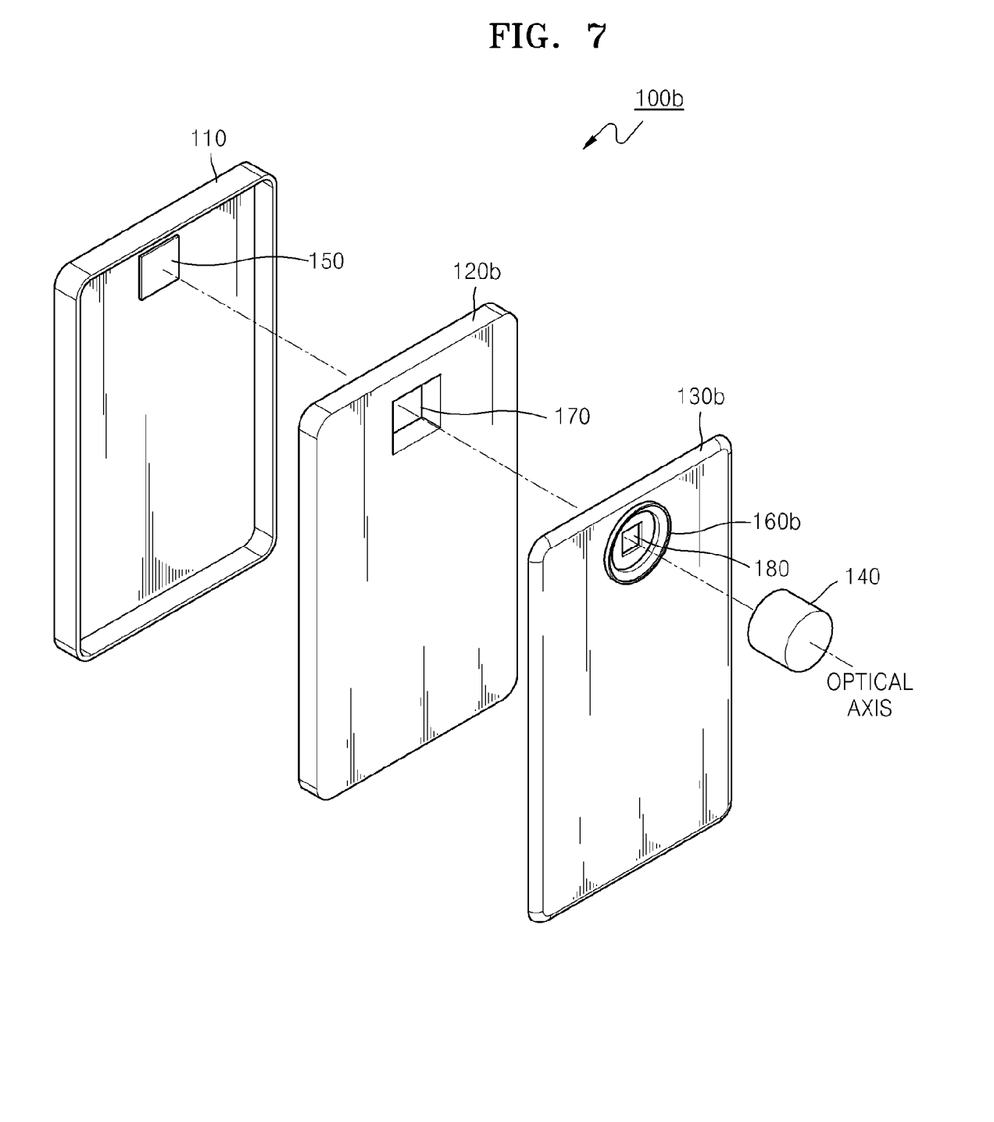
FIG. 7 is a perspective view illustrating a photographing apparatus, according to another embodiment.

FIG. 7 is a perspective view illustrating a photographing apparatus 100*b*, according to another embodiment.

According to another embodiment, the photographing apparatus 100*b* includes a main body 110, a middle cover 120*b*, and a rear cover 130*b*. The first connector 160*b* is disposed on the rear cover 130*b*. The first connector 160*b* is disposed such that the center of the optical axis of the external optical component 140 coincides with the center of the optical axis of the image pickup device 150, when the external optical component 140 is coupled to the first connector 160*b*. According to this embodiment, users may couple the external optical component 140 to the first connector 160*b* on the rear cover 130*b*, without the need to separate the rear cover 130*b* from the main body 110 or the middle cover 120*b* to couple the external optical component 140 with the first connector 160*b*. According to this embodiment, the middle cover 120*b* has the first opening 170 at a position corresponding to the image pickup device 150 so as to expose the image pickup device 150 through the first opening 170. The rear cover 130*b* has the second opening 180 disposed on an inside region of the first connector 160*b*. The second opening 180 is formed at a position corresponding to the image pickup device 150 so as to expose the image pickup device 150 through the second opening 180. As shown in FIG. 7, the second opening 180 may be formed to open a portion of the inside region of the first connector 160*b*. In an alternative embodiment, the second opening 180 may be formed to open the entire inside region of the first connector 160*b*.

Figure 8:
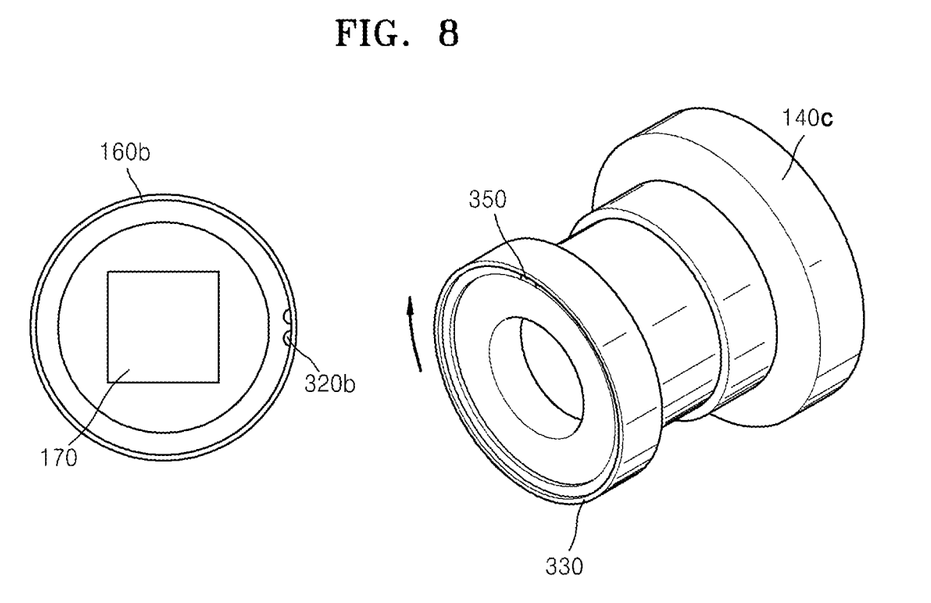
FIG. 8 is a partially enlarged view showing a first connector of the rear cover and a structure of an external optical component, according to another embodiment.

FIG. 8 shows a partially enlarged view of the first connector 160*b* of the rear cover 130*b* and a structure of an external optical component 140*c*, according to another embodiment.

According to another embodiment, no electrode is formed in the rear cover 130*b* or the first connector 160*b*. According to this embodiment, the first connector 160*b* is disposed on the rear cover 130*b*, thus improving ease of use of the external optical component 140*c* and preventing malfunctions due to electrode damage. The first connector 160*b* may also include an anchor 320*b* to fix the external optical component 140*c* at a specific position.

Also, the external optical component 140*c* may not have any corresponding electrode. However, in this embodiment, it is also possible to form the external optical component 140*c* to have an electrode. The external optical component 140 may also include a second connector 330 and an anchor 350.

Figure 9:
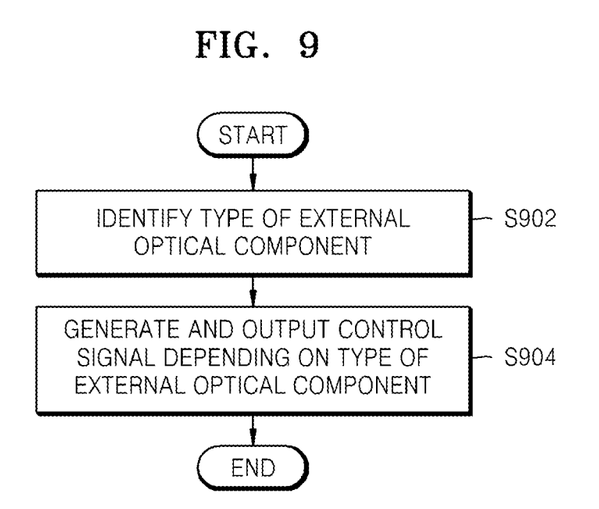
FIG. 9 is a flowchart illustrating a method of controlling the external optical component, according to an embodiment.

FIG. 9 is a flowchart showing a method of controlling the external optical component 140, according to an embodiment.

According to an embodiment, the main body 110 identifies the type of the external optical component 140, and may control the external optical component 140 depending on the type of the external optical component 140.

First of all, when the main body 110 is coupled to the external optical component 140, the type of the external optical component 140 is identified in operation S902. The main body 110 may receive an input with the identifying information of the external optical component 140 through the first electrode 310*a* or 310*b*, and may identify the type of the external optical component 140.

Next, the main body 110 generates a control signal for controlling the external optical component 140 and outputs the control signal to the external optical component 140, depending on the type of the external optical component 140 in operation S904. For example, in the case that the external optical component 140 is an interchangeable lens, the main body 110 may generate a control signal to perform an auto focus function, a control signal to perform a zoom function, a shutter release signal etc. The main body 110 may then output the generated control signal to the external optical component 140.

Figure 10:
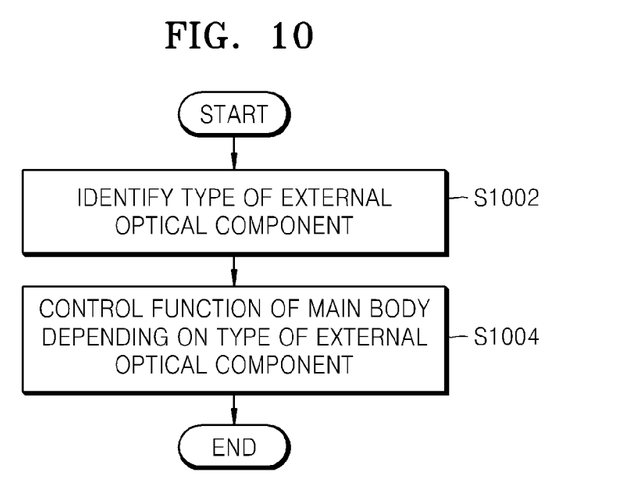
FIG. 10 is a flowchart view illustrating a method of controlling photographing apparatuses, according to an embodiment.

FIG. 10 is a flowchart showing a method of controlling the photographing apparatus 100*a* or 100*b*, according to an embodiment.

According to an embodiment, the main body 110 identifies the type of the external optical component 140 in operation S1002 when the external optical component 140 is coupled to the main body 110. The main body 110 may receive identifying information of the external optical component 140 through the first electrode 310*a* or 310*b*, and may identify the type of the external optical component 140.

Next, depending on the type of the external optical component 140, some of the functions of the photographing apparatus 100*a* or 100*b* may be controlled in operation S1004. For example, the main body 110 is equipped with a zoom lens, and in the case that the coupled external optical component 140 is an interchangeable lens, the control of the zoom lens by the main body 110 may be deactivated. As another example, the main body 110 is equipped with a shutter, and in the case that the shutter is provided in the coupled external optical component 140, the shutter provided in the main body 110 may be fixed in an open state and may be deactivated.

In addition, in the case that a control signal for the external optical component 140 needs to be generated, some of the controls of the main body 110 may be activated in order to control the external optical component 140. For example, in the case that the external optical component 140 is an interchangeable lens, the main body 110 may activate controls, such as driving of the lens, driving of the shutter, and aperture control of the external optical component 140.

In addition, the main body 110 may recognize the type of the external optical component 140 and may control the photographing apparatus 100*a* or 100*b* depending on the type of the external optical component 140. For example, in the case that the external optical component 140 is an optical filter, an image processing of a captured image may take into account the application of the optical filter, and the image processing may be changed. Also, for example, in the case that the external optical component 140 is an interchangeable lens having an anti-shake function, a shake correction degree may be reduced, a shake correction processing may be processed to complement the interchangeable lens, or the shake correction processing may be omitted, during the image processing. As another example, when the captured image is stored, the type of the external optical component 140 may be recorded together with metadata. As another example, the photographing apparatus 100 may use and control the optical zoom function of the external optical component 140 rather than the zoom function of the main body 110, in the case that the external optical component 140 has the optical zoom function.

Figure 11:
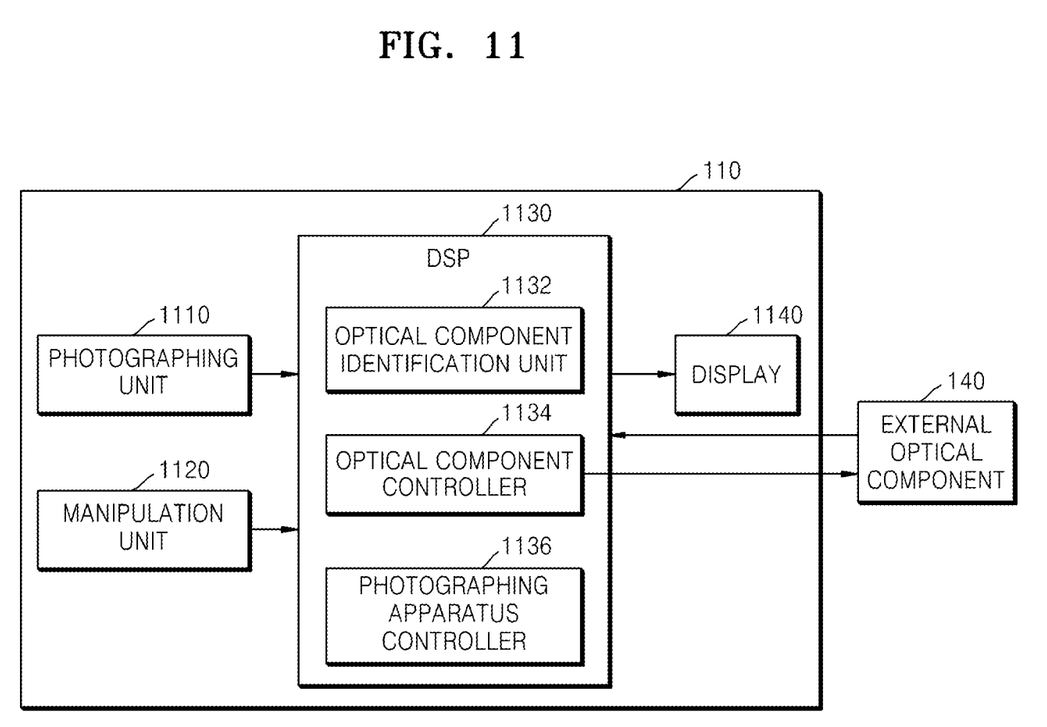
FIG. 11 is a block diagram showing a structure of a main body and an external optical component, according to an embodiment.

FIG. 11 is a block diagram showing a structure of the main body 110 and the external optical component 140, according to an embodiment.

According to an embodiment, the main body 110 includes a photographing unit 1110, a manipulation unit 1120, a digital signal processor (DSP) 1130, and a display 1140.

The photographing unit 1110 includes an image pickup device 150 (shown in FIG. 1) to photoelectrically convert incident light to thus generate an image pickup signal. As stated previously, the photographing unit 1110 may be provided without a lens, or may be provided with the image pickup device 150 and the lens.

The manipulation unit 1120 receives a user input. The manipulation unit 1120 may be implemented as a keypad, a touch screen, buttons, etc.

The DSP 130 controls the overall operation of the photographing apparatus 100, processes the image pickup signal, and generates a captured image. According to an embodiment, the DSP 130 may include an optical component identification unit 1132, an optical component controller 1134, and a photographing apparatus controller 1136.

The optical components identification unit 1132 identifies the type of the external optical component 140 if the external optical component 140 is coupled to the first connector 160*a* or 160*b*. Information about the type of external optical component 140 may be provided from the external optical component 140 through the first electrode 310*a* or 310*b*.

The optical components controller 1134 controls the external optical component 140 depending on the type of the external optical component 140. To this end, the optical component controller 1134 generates a control signal depending on the type of the external optical component 140, and outputs the control signal to the external optical component 140.

The photographing apparatus controller 1136 controls the photographing apparatus depending on the type of the external optical component 140. For example, in the case that the external optical component 140 is an interchangeable lens, a lens control function, an aperture control function, and a shutter control function provided in the main body 110 may be deactivated. Also the photographing apparatus controller 1136 may take into account the type of the external optical component 140, and may change the control of the photographing apparatus. For example, in the case that an optical filter is included in the external optical component 140, the image processing of the imaging pickup signal may be changed.

The display 1140 displays a user interface screen image, a captured image, etc. The display 1140 may be implemented as an organic light-emitting display device, a liquid crystal display, and an electrophoretic display device, etc.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A photographing apparatus comprising:
   a main body having an image pickup device disposed on a back side of the main body;
   a middle cover coupled to the back side of the main body, and having a first opening disposed to correspond to a position of the image pickup device so that light can be incident onto the image pickup device through the first opening, the middle cover comprising a first connector formed around the first opening, wherein the first connector is configured to couple to an external optical component, the first connector is disposed so that an optical axis of the image pickup device coincides with an optical axis of the external optical component, when the external optical component is coupled to the first connector, and the first connector comprises a first electrode that is electrically connected to a second electrode of the external optical component; and
   a rear cover coupled to the middle cover and having a second opening disposed to correspond to the position of the image pickup device so that light can be incident onto the image pickup device through the second opening,
   wherein the main body further comprises a photographing apparatus controller that deactivates a function of the photographing apparatus while the external optical component is coupled to the first connector, when the function of the photographing apparatus is redundant of a function of the external optical component, depending on a type of the external optical component.

2. The photographing apparatus of claim 1, wherein the second opening is formed to match a shape of the external optical component, when the external optical component is coupled to the first connector.

3. The photographing apparatus of claim 1, wherein the first connector has a shape that surrounds the first opening, and the middle cover comprises a first electrode that is formed between the first opening and the first connector and is electrically connected to the external optical component.

4. The photographing apparatus of claim 1, wherein the main body further comprises a lens disposed on the image pickup device.

5. The photographing apparatus of claim 1, wherein the main body further comprises:
   a processor that identifies a type of the external optical component; and
   an optical component controller that generates a control signal to control the optical component based on the type of the external optical component.

6. The photographing apparatus of claim 1, wherein the first connector has a circular-ring shape formed around the first opening and couples to a second connector of the external optical component.

7. The photographing apparatus of claim 1, wherein the external optical component is at least one of an interchangeable lens, an optical filter, a shutter, an aperture, a microphone, and a flash.

8. The photographing apparatus of claim 1, further comprising a detachable protective cover that covers the image pickup device and couples to the first connector, when the external optical component is not coupled to the first connector.

9. A photographing apparatus comprising:
   a main body having an image pickup device disposed on a back side of the main body;
   a middle cover coupled to the back side of the main body and having a first opening disposed to correspond to a position of the image pickup device so that light can be incident onto the image pickup device through the first opening; and
   a rear cover coupled to the middle cover and having a second opening disposed to correspond to the position of the image pickup device so that light can be incident onto the image pickup device through the second opening;
   wherein the rear cover comprises a first connector formed around the second opening, wherein the first connector is configured to couple to an external optical component, the first connector is disposed so that an optical axis of the image pickup device coincides with the optical axis of the external optical component, when the external optical component is coupled to the first connector, and the first connector comprises a first electrode that is electrically connected to a second electrode of the external optical component; and wherein the main body further comprises a photographing apparatus controller that deactivates a function of the photographing apparatus while the external optical component is coupled to the first connector, when the function of the photographing apparatus is redundant of a function of the external optical component, depending on a type of the external optical component.

10. The photographing apparatus of claim 9, wherein the first connector has a circular-ring shape formed around the second opening and couples to a second connector of the external optical component.

11. The photographing apparatus of claim 9, wherein the external optical component is at least one of an interchangeable lens, an optical filter, a shutter, an aperture, a microphone, and a flash.

12. The photographing apparatus of claim 9, further comprising a detachable protective cover that covers the image pickup device and couples to the first connector, when the external optical component is not coupled to the first connector.

13. A method of controlling a photographing apparatus that includes a middle cover disposed on a back side of a main body and comprising a first connector so that an external optical component is coupled to the first connector, the method comprising:

identifying a type of the external optical component;

depending on the type of the external optical component, generating a control signal to control the external optical component; and depending on the type of the external optical component, deactivating a function of the photographing apparatus that is redundant of a function of the external optical component while the external optical component is coupled to the first connector, wherein the first connector comprises a first electrode that is electrically connected to a second electrode of the external optical component.

14. The photographing apparatus control method of claim 13, wherein when the external optical component has an anti-shake function, reducing or omitting a shake correction processing of the photographing apparatus to complement the anti-shake function of the external optical component.

15. The photographing apparatus control method of claim 13, further comprising applying an optical zoom function of the external optical component instead of an optical zoom function of the photographing apparatus, when the external optical component has the optical zoom function.

16. The photographing apparatus control method of claim 13, further comprising storing information about the external optical component together with a captured image.

17. The photographing apparatus control method of claim 13, further comprising fixing and deactivating a shutter of the main body in an open state, when the external optical component has a shutter.

18. The photographing apparatus control method of claim 13, further comprising sending an auto-focus control signal to the external optical component, when the external optical component is an interchangeable lens.

* * * * *